Nov. 20, 1962 — I. HERTZBERG — 3,064,379
ARTIFICIAL CHRISTMAS TREE
Filed June 3, 1960 — 2 Sheets-Sheet 1
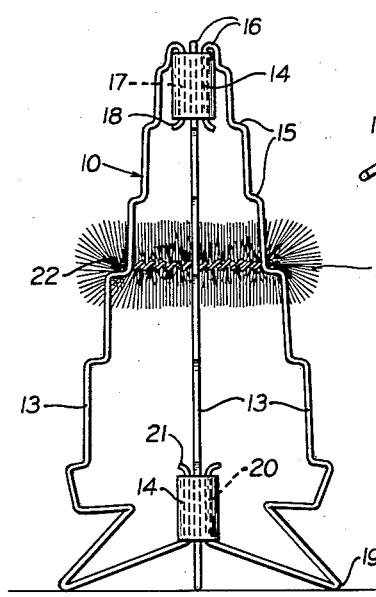
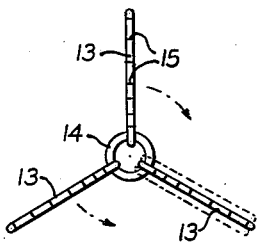
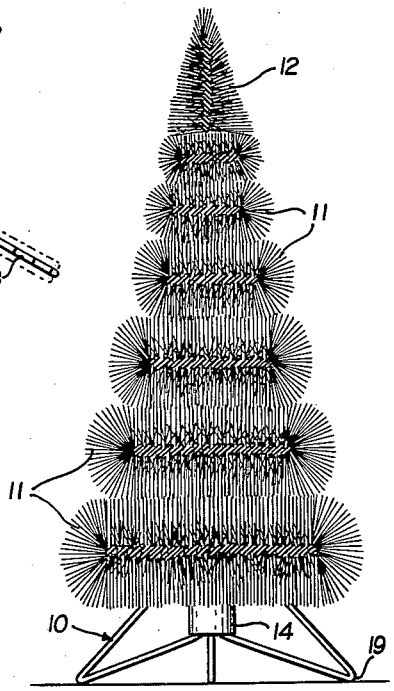
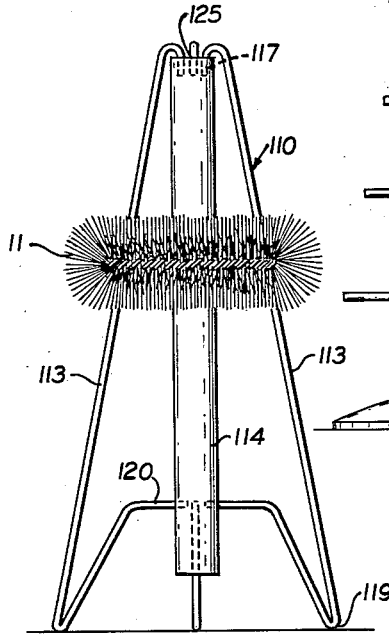
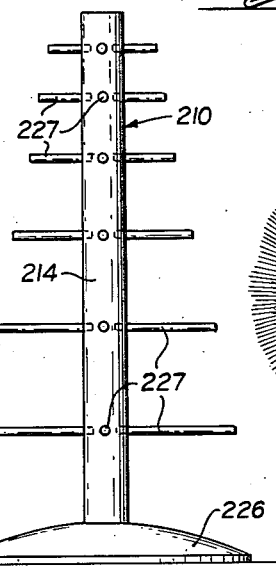
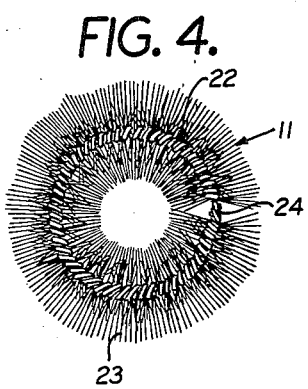
INVENTOR
IRA HERTZBERG
BY Blum, Moscovitz,
Friedman & Blum
ATTORNEYS.

Nov. 20, 1962     I. HERTZBERG     3,064,379
ARTIFICIAL CHRISTMAS TREE
Filed June 3, 1960     2 Sheets-Sheet 2
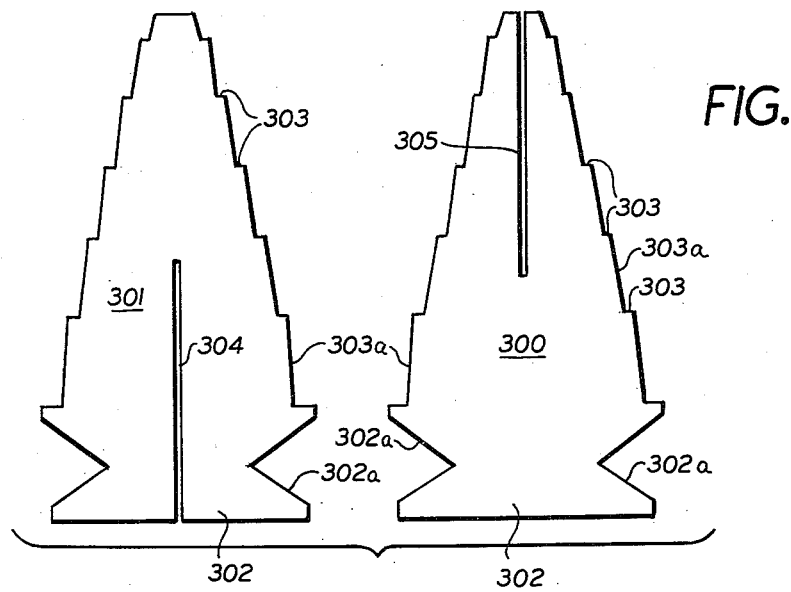
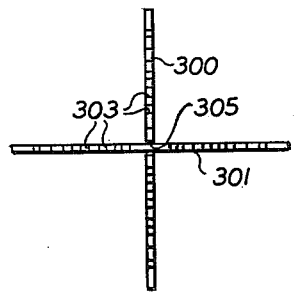
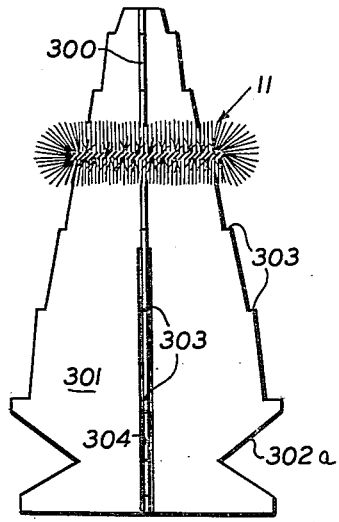
INVENTOR
IRA HERTZBERG
ATTORNEYS.

_United States Patent Office_

3,064,379
Patented Nov. 20, 1962

3,064,379
ARTIFICIAL CHRISTMAS TREE
Ira Hertzberg, Goshen, N.Y., assignor to H. Hertzberg & Son, Inc., Middletown, N.Y., a corporation of New York
Filed June 3, 1960, Ser. No. 33,849
4 Claims. (Cl. 41—15)

This invention relates to an artificial tree and more particularly to an artificial Christmas tree of the generally conical variety.

An object of this invention is to provide a tree of such nature which has a suitable frame on which generally toroidal or circular brushes simulating foliage may be supported in such manner as to dispense with fasteners of any description.

A further object of this invention is to provide a tree of such nature which can be readily assembled and dismantled, is of light weight material and can be conveniently stored for re-use.

Another object of this invention is to provide a tree of such nature to be adorned with festive lights or the like, which can be made of non-inflammable materials so as to minimize the hazard of fire.

An additional object of this invention is to provide a tree of such nature that is comparatively inexpensive and simple to manufacture.

Other objects and advantages of this invention are hereinafter set forth or will appear in the further course of the specification.

For an understanding of the principles of this invention, reference is made to the following description of typical embodiments thereof as illustrated in the accompanying drawings.

In the drawings,

FIG. 1 is a side elevational view of one embodiment of the assembled artificial tree.

FIG. 2 is a side elevational view of the frame of the embodiment shown in FIG. 1 with one of the toroidal brushes in position.

FIG. 3 is a top plan view of the frame shown in FIG. 2.

FIG. 4 is a plan view of a representative toroidal brush.

FIG. 5 is a side elevational view of another embodiment of the artificial tree frame with one of the toroidal brushes in position.

FIG. 6 is a side elevational view of a third embodiment of the artificial tree frame.

FIG. 7 is a plan view of blanks for a frame of a fourth embodiment of the artificial tree.

FIG. 8 is a side elevational view of the assembled frame with one toroidal brush in position.

FIG. 9 is a bottom plan view of the frame.

One embodiment of the invention, illustrated in FIGS. 1 to 4 of the drawings comprises a frame generally 10, a plurality of toroidal brushes 11 of suitable unequal diameters, illustratively six in number, and a conical shaped brush 12 with a base having a diameter substantially equal to the outer diameter of the smallest toroidal brush 11.

The frame 10 comprises three similarly shaped resilient wire legs 13, and two hollow cylinders 14 spaced in axial alignment along the longitudinal axis of the frame 10. The wire legs 13 are preformed by appropriate bending to provide six generally horizontal steps 15 as viewed in FIG. 2, the corresponding steps 15 of the wire legs 13 defining six horizontal support planes for the toroidal brushes 11. The wire legs 13 are crimped 16 near the upper ends thereof about the upper cylindrical wall end of cylinder 14. A segment 17 of each wire leg 13 extends along the inner surface of cylinder 14 and emerges from the lower end thereof with a slight outward bend 18 to restrain the cylinder 14 from longitudinal motion. At the lower ends of the wire legs 13 there are sharp angle bends forming supporting toes 19, and longitudinal wire segments 20 extending upwardly along the inner surface of the second cylinder 14, emerging from the upper end thereof with slight outward bends 21 to restrain the second cylinder 14 from longitudinal motion. The frame, assembly 10 as viewed in FIG. 2 presents the appearance of a tripod having its largest transverse dimension at the base thereof and generally tapering to a relatively narrow apex.

In FIG. 3 is shown a top plan view of the frame 10 of this embodiment with broken arrows indicating how any two of the wire legs 13 may be rotated so as to lie flush on either side of the third wire leg 13, thereby forming a generally single plane structure for convenient storage.

In FIG. 4 is a plan view of a toroidal or circular brush 11 of familiar construction, having a central twisted wire support 22 with bristles 23 entwined therethrough and radiating therefrom. The twisted wire 22 has a generally circular form and the ends 24 thereof have been suitably joined by welding or the like. In the interest of clarity, the inner diameter of the toroidal brush hereinafter referred to will mean the diameter of the plane defined by the twisted wire support 22.

The invention arrangement of the embodiment is assembled as follows:

The end segments 17, 20 of the wire legs 13 are inserted in the cylinders 14 and the wire legs 13 are positioned in equally spaced relationship around the longitudinal axis of the frame 10. The frame 10 can accordingly be placed in a standing position on the three supporting toes 19. The largest inner diameter toroidal brush 11 is then slipped over the top of the frame 10 as viewed in FIG. 2, readily passing over the support planes of lesser transverse dimension defined by the upper steps 15, until it reaches the lowest supporting plane of largest transverse dimension where it is positioned on the lowest steps 15. The next largest inner diameter toroidal brush 11 is then similarly slipped over the apex of the frame 10 until it comes to rest on the next higher supporting steps 15. The same procedure is followed for the remaining toroidal brushes 11 until they are all fitted on the frame 10. Finally, the generally conical brush 12 is suitably positioned on the top of the frame 10 as viewed in FIG. 1 to complete the assembly of the artificial tree. The tree may then be festooned with artificial snow, electric lights and other decorations as is customary with grown Christmas trees.

In FIG. 5 is another embodiment of the tree frame 110 comprising three wire legs 113 and a cylindrical solid support column 114. The upper face 125 of the support column 114 has three holes or axial bearings of suitable depth squally spaced radially and circumferentially therein. Near the lower end of the support column 114 are three holes or recesses of suitable depth equally spaced around the cylindrical wall of the column 114 corresponding to the holes in the upper face 125. The three wire legs 113 have upper longitudinal segments 117 and lower horizontal segments 120 for frictional insertion in the respective upper and lower holes of the column 114. The resiliency of the wire legs 113 permits easy assembly and creates tensile stresses which bind the wire segments 117, 120 firmly in their respective holes. The wire legs 113 have sharp angle bends at the lower ends thereof forming supporting toes 119. The frame assembly 110 as viewed in FIG. 5 presents the appearance of a tripod having its largest transverse dimension at the base thereof and tapering to a relatively narrow apex.

The invention arrangement of the second embodiment is assembled as follows:

The end segments 117, 120 of the wire legs 113 are inserted in the respective upper and lower holes of the support column 114, and the frame 110 is placed in a standing position on the three supporting toes 119. As in the first embodiment, the largest inner diameter toroidal brush 11 is slipped over the top of the frame 110 as viewed in FIG. 5 and descends the length of the frame 110 until it reaches a position along the longitudinal axis of the frame 110 where the transverse dimension of the frame 110 is just equal to the inner diameter of the toroidal brush 11. The toroidal brush 11 is thereby held in binding engagement in a horizontal plane against the wire legs 113. The procedure is repeated for the toroidal brushes 11 of successively smaller inner diameter until all of the toroidal brushes 11 are fitted on the frame 110 in horizontal positions at levels corresponding to their inner diameters. Finally, as for the first embodiment, a conical brush 12 may be suitably affixed to the top of the frame 110 to complete the assembly.

In FIG. 6 is a third embodiment of the tree frame 210 comprising a convex base 226, a solid cylindrical column 214 and a number of rods 227 extending radially from said column 214. The column 214 is centrally affixed at one end to the base 226 and has groups of four equally spaced circumferential holes drilled to a desired depth at suitable intervals along the length thereof. The rods 227 are of equal length and are force-fitted into the four holes of each group, the length of the rods, however, differing with each group. The rods 227 for the lowest group of holes as viewed in FIG. 6 are of the greatest length and the successively higher groups of holes have correspondingly shorter rods 227.

The invention arrangement of the third embodiment is assembled as follows:

The column 214 is fixed to the center of the convex base 226 by any suitable means. The rods 227 are inserted into the appropriate predrilled holes in the cylindrical column 214. The toroidal brush 11 of largest diameter is slipped over the top of the frame 210 as viewed in FIG. 6 and descends the length of the frame 210 unhindered by the rods 227 that have a shorter length than the inner radius of the toroidal brush 11, until it reaches the lowest rods 227 of the greatest length on which it is finally positioned. The procedure is repeated for the succeeding toroidal brushes 11 of smaller inner diameter until all of the toroidal brushes 11 are positioned on the rods 227 of appropriate length. Thereafter, as in the other embodiment, the conical brush 12 may be suitably positioned to the free end of the column 214 to complete the assembly.

A fourth embodiment of the invention is shown in FIGS. 7–9. FIG. 7 shows planar forms 300 and 301, made of cardboard or other suitable material. Each said form has a generally rectangular base 302 with V-shaped cutouts 302a on each side thereof. Above the base 302, each form 300 and 301 is tapered and is cut out to provide a series of steps 303 on each side thereof. It will be apparent that the width of the form at each step 303 decreases in the direction of height away from base 302. The side edge portions 303a of each form preferably converge slightly in the direction of height of the form away from base 302.

A slot 304 extends upwardly and axially from the bottom of form 302, halfway to the top thereof. A slot 305 extends axially from the top of form 300, downwardly halfway toward the bottom thereof.

The two forms 300 and 301 are assembled by extending the top portion of form 301 into slot 305 and the bottom portion of form 300 into slot 304. Preferably, in use, the two forms 300 and 301 are disposed at right angles to each other, although it will be apparent that for storage purposes, the two forms may be moved relative to each other out of their perpendicular relationship if desired. Furthermore, of course, the two forms may be readily separated from each other for storage purposes.

The toroidal brush 11 is the same as in the first embodiment, only one such brush being shown illustratively in FIG. 9. It will be apparent that brushes 11 of various diameters may be disposed upon the various steps 303, at each level thereof. In other words, at each level, a toroidal brush 11 of appropriate diameter may be supported by four steps 303 in close relationship to the form edges 303a just above the steps 303 in question. It will be apparent that the same ornamental effect can be achieved as in the case of the other embodiments.

All of the embodiments of the invention above described contain an unobstructed passage extending along the longitudinal axis of the tree to permit the installation of appropriate wiring therethrough which will be substantially hidden from exterior view. Head wires may then be extended from the interior wiring to sockets on the exterior of the tree which may be provided with multicolored lamps to supply the usual Christmas tree illumination.

The above-described embodiments are also readily collapsible to permit storage in a substantially lesser space than occupied by the assembled tree. The brushes may be easily removed. The legs 13 of the frame 10 in the first two embodiments may be rotated to abut each other as previously described. The base 226, column 214 and rods 227 of the third embodiment may be detached from each other. The fourth embodiment is also collapsible.

While several specific embodiments of the invention have been described in detail to illustrate the application of the invention principles, it will be understood that the invention may be embodied otherwise without departing from such principles.

What is claimed is:

1. An artificial tree comprising vertically extending support column means, a plurality of upwardly extending, inwardly inclined legs circumferentially spaced about said column means and adapted to rest at their lower ends upon a support so as to support said artificial tree, means extending inwardly upwardly from the lower ends of said legs and coupled to said column means and supporting said column means above said support, means connecting the upper ends of said legs to the upper end of said column means, and a plurality of branch-simulating supported elements, each said supported element being a generally circular brush comprising a circular rod-like core and stiff bristles extending transversely from said core, said cores being of varying diameters and being respectively received on said legs against the outer edges thereof in the order of diameter of said cores with the core of largest diameter at the bottom, each said core being frictionally supported by said legs, the proximate bristles of successive supported elements respectively substantially abutting each other, said column means and said supported elements being substantially co-axial.

2. An artificial tree in accordance with claim 1, each said leg having respective generally horizontal portions spaced by generally vertical portions, each said core resting upon generally horizontal portions of respective legs and substantially abutting generally vertical portions of respective legs.

3. An artificial tree in accordance with claim 1, said column means having end axial bearings, said legs having portions extending turnably into said respective end bearings, whereby said legs may be turned about said axis so as in the alternative to locate said legs in general abutment with each other for storage purposes and to locate said legs in their aforesaid circumferentially displaced position for receiving said supported elements.

4. An artificial tree in accordance with claim 1, said column means comprising a rigid rod, said rod having recesses releasably receiving the means connecting said legs to said rod.

References Cited in the file of this patent

UNITED STATES PATENTS

| | | |
|---|---|---|
| 1,636,981 | Berman | July 26, 1927 |
| 1,654,427 | Modlarz | Dec. 27, 1927 |
| 2,067,527 | Greene | Jan. 12, 1937 |
| 2,911,748 | Rodgers | Nov. 10, 1959 |
| 2,916,843 | Meyer | Dec. 15, 1959 |
| 3,027,671 | Duvall | Apr. 3, 1962 |